(12) United States Patent
Hong et al.

(10) Patent No.: US 7,443,479 B2
(45) Date of Patent: Oct. 28, 2008

(54) LIQUID CRYSTAL DISPLAY DEVICE PREVENTING ELECTRONIC CORROSION AND METHOD OF FABRICATING THE SAME

(75) Inventors: Jin-Cheol Hong, Gyeongsangbuk-do (KR); Sung-Il Park, Dae-gu (KR); Pyung-Hun Kim, Gyeongsangbuk-do (KR); Kwang-Soon Park, Dae-gu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/879,344

(22) Filed: Jun. 30, 2004

(65) Prior Publication Data

US 2005/0041189 A1 Feb. 24, 2005

(30) Foreign Application Priority Data

Aug. 22, 2003 (KR) .................. 10-2003-0058179

(51) Int. Cl.
*G02F 1/1345* (2006.01)
(52) U.S. Cl. ........................................... 349/149
(58) Field of Classification Search ............... 349/149
See application file for complete search history.

(56) References Cited

U.S. PATENT DOCUMENTS

| 6,934,000 B1* | 8/2005 | Ishii et al. ............ 349/149 |
| 2002/0145694 A1* | 10/2002 | Jang ........................... 349/138 |
| 2005/0041189 A1* | 2/2005 | Hong et al. ............... 349/149 |

* cited by examiner

*Primary Examiner*—David C. Nelms
*Assistant Examiner*—Phu Vu
(74) *Attorney, Agent, or Firm*—Morgan Lewis & Bockius LLP

(57) ABSTRACT

A liquid crystal display (LCD) device includes a gate line and a data line crossing each other, a gate driving unit and a data driving unit outputting signals to the gate line and the data line, a gate pad portion electrically connected to the gate line and having a first contact hole, a data pad portion electrically connected to the data line and having a second contact hole, a first output terminal of the gate driving unit completely covering the first contact hole, a second output terminal of the data driving unit completely covering the second contact hole, a first conductive film electrically connecting the first output terminal and the gate pad portion, and a second conductive film electrically connecting the second output terminal and the data pad portion.

24 Claims, 8 Drawing Sheets

LIQUID CRYSTAL DISPLAY DEVICE PREVENTING ELECTRONIC CORROSION AND METHOD OF FABRICATING THE SAME

BACKGROUND OF THE INVENTION

This application claims the benefit of Korean Patent Application No. 2003-0058179, filed on Aug. 22, 2003, which is hereby incorporated by reference.

FIELD OF THE INVENTION

The present invention relates to a liquid crystal display (LCD) device, and more particularly, to an LCD device capable of preventing electronic corrosion and a method of fabricating the same.

DISCUSSION OF THE RELATED ART

Recently, flat panel display (FPD) devices have been the subject of research because of their high portability and low power consumption. Among the various types of FPD devices, LCD devices are widely used as monitors for notebooks and desktop computers because they can display images (including moving images) with high resolution and bright colors.

Generally, an LCD device includes a color filter substrate and an array substrate that sandwich a liquid crystal layer, and each includes a common electrode and a pixel electrode. When a voltage is applied to the common electrode and the pixel electrode, an electric field is generated to change the orientation of liquid crystal molecules having an optical anisotropy within the liquid crystal layer. Consequently, light transmittance characteristics of the liquid crystal layer become modulated and images are displayed on the screen of the LCD device.

FIG. 1 is a schematic plan view showing an array substrate for an LCD device according to the related art. In FIG. 1, a gate line 120 and a data line 130 are formed on a substrate 110. The gate line 120 crosses the data line 130 to define a pixel region "P." A thin film transistor (TFT) "T" is connected to the gate and data lines 120, 130. A gate pad portion "G" is formed at one end of the gate line 120 and a data pad portion "D" is formed at one end of the data line 130. Signals are supplied to the gate line 120 and the data line 130 through the gate pad portion "G" and the data pad portion "D."

The TFT "T" includes a gate electrode 122, a source electrode 132, a drain electrode 134 and a semiconductor layer 124. The gate electrode 122 is connected to the gate line 120 and supplied with a scanning signal. The source electrode 132 is connected to the data line 130 and supplied with a video signal. The drain electrode 134 is spaced apart from the source electrode 132. The semiconductor layer 124 is interposed between the gate electrode 122 and the source and drain electrodes 132, 134. A pixel electrode 136 is formed in the pixel region "P" and connected to the drain electrode 134 through a contact hole 147. The pixel electrode 136 overlaps a previous gate line.

The gate pad portion "G" transmits the scanning signal to the gate line 120. The gate pad portion "G" includes a gate pad 140 and a gate pad terminal 144 on the gate pad 140. The gate pad terminal 144 is connected to the gate pad 140 through a gate pad contact hole 141. The data pad portion "D" transmits the video signal to the data line 130. The data pad portion "D" includes a data pad 142 and a data pad terminal 146 on the data pad 142. The data pad terminal 146 is connected to the data pad 142 through a data pad contact hole 143.

FIG. 2A is a schematic cross-sectional view taken along line "IIa-IIa" of FIG. 1 to show the gate pad portion "G," and FIG. 2B is a schematic cross-sectional view taken along line "IIb-IIb" of FIG. 1 to show the data pad portion "D." As shown in FIG. 2A, the gate pad 140 is formed on the substrate 110. A gate insulating layer 112 and a passivation layer 138 are sequentially formed on the gate pad 140. The gate insulating layer 112 and the passivation layer 138 have the gate pad contact hole 141 exposing a portion of the gate pad 140. A gate pad terminal 144 is formed on the passivation layer 138 and connected to the gate pad 140 through the gate pad contact hole 141. The gate pad terminal 144 is formed of a transparent conductive material such as indium-tin-oxide (ITO), indium-zinc-oxide (IZO) or the like. An exterior scanning signal is transmitted to the gate pad 140 through the gate pad terminal 144. In addition, the gate pad terminal 144 protects the gate pad 140 from electronic corrosion. The gate pad 140 is formed of a conductive metallic material such as aluminum (Al), tungsten (W), molybdenum (Mo), chromium (Cr) or the like. When the conductive metallic material is exposed, moisture and dust may cause the electronic corrosion of the conductive metallic material. Accordingly, the gate pad 140 is shielded from the exterior by the gate pad terminal 144 to prevent the electronic corrosion of the gate pad 140.

As shown FIG. 2B, a gate insulating layer 112 is formed on the substrate 110 and the data pad 142 is formed on the gate insulating layer 112. The passivation layer 138 is formed on the data pad 142 and has the data pad contact hole 143 exposing a portion of the data pad 142. The data pad terminal 146 is formed on the passivation layer 138 and connected to the data pad 142 through the data pad contact hole 143. The data pad terminal 146 is formed of a transparent conductive material such as indium-tin-oxide (ITO), indium-zinc-oxide (IZO) or the like. Similar to the gate pad terminal 144 of FIG. 2A, an exterior video signal is transmitted to the data pad 142 through the data pad terminal 146 and the data pad terminal 146 shields the data pad 142 from the exterior to prevent the electronic corrosion of the data pad 142.

The scanning signal applied to the gate pad portion "G" is transmitted to the TFT "T" (shown in FIG. 1) through the gate line 120 (shown in FIG. 1) and the video signal applied to the data pad portion "D" is transmitted to the TFT "T" through the data line 130 (of FIG. 1). The TFT "T" is turned on/off according to the scanning signal, and the video signal is transmitted to a pixel electrode 136 (of FIG. 1) when the TFT "T" is turned on. In addition, the LCD device further includes a gate driving unit and a data driving unit for applying the scanning signal and the video signal.

A driving circuit including the gate driving unit and the data driving unit may be classified as a chip on glass (COG) type, a tap carrier package (TCP) type, and a chip on film (COF) type according to a packaging method thereof. In the COG type driving circuit, since the driving circuit directly contacts both the gate pad portion "G" and the data pad portion "D," signals from the driving circuit are transmitted directly to the gate pad portion "G" and the data pad portion "D."

FIG. 3 is a schematic plan view showing such a COG type LCD device according to the related art. In FIG. 3, an LCD device 100 includes a display area "E" and a non-display area "N." The gate and data lines 120, 130 crossing each other are disposed in the display area "E." A gate driving unit 160 and a data driving unit 170 are disposed in the non-display area "N." A gate link line 162 connected to the gate line 120 and a data link line 172 connected to the data line 130 are also disposed in the non-display area "N." The gate driving unit 160 is connected to the gate link line 162 through the gate pad portion "G" (shown in FIG. 2A) and the data driving unit 170 is connected to the data link line 172 through the data pad portion "D" (shown FIG. 2B). Accordingly, a scanning signal output from the gate driving unit 160 is transmitted to the gate line 120 through the gate pad portion "G" and the gate link line 162 and a video signal output from the data driving unit 170 is transmitted to the data line 130 through the data pad portion "D" and the data link line 172.

The scanning signal and the video signal are output from a gate output terminal (not shown) and a data output terminal (not shown), respectively. Thus, the gate output terminal and the data output terminal contact the gate pad portion "G" and the data pad portion "D," respectively. Although not shown in FIG. 3, the gate driving unit 160 and the data driving unit 170 are connected to an external printed circuit board (PCB) through a flexible printed circuit (FPC).

FIG. 4 is a schematic cross-sectional view showing a gate pad portion and a gate output terminal of an LCD device according to the related art. In FIG. 4, a gate pad bump 180 is used as a gate output terminal of a gate driving unit. The gate pad bump 180 is electrically connected to the gate pad terminal 144 of a gate pad portion through a plurality of conductive balls 192 in an anisotropic conductive film (ACF) (not shown). Accordingly, a scanning signal from the gate pad bump 180 is transmitted to the gate pad terminal 144 through the anisotropic conductive balls 192. In addition, the scanning signal is transmitted to the gate line 120 (shown FIG. 3) through the gate link line 162 (of FIG. 3) to turn on/off the TFT "T" (of FIG. 1). The gate pad bump 180 is formed of a conductive material such as copper (Cu) or the like. The gate pad bump 180 is narrower than the gate pad contact hole 141 in the gate insulating layer 112 and the passivation layer 138, thereby exposing a portion of the gate pad terminal 144 in the gate pad contact hole 141.

FIG. 5 is a schematic plan view showing a gate pad portion and a gate output terminal of an LCD device according to the related art. In FIG. 5, since a width of the gate pad bump 180 is less than that of the gate pad contact hole 141, a portion "C" of the gate pad terminal 144 in the gate pad contact hole 141 is not covered with the gate pad bump 180 and exposed.

FIGS. 6A and 6B are schematic views illustrating transformation of a plurality of conductive balls according to the related art. In FIG. 6A, the conductive ball 192 in an anisotropic conductive film (ACF) includes first, second and third portions "R1," "R2" and "R3." The first portion "R1" is formed of a plastic resin, the second portion "R2" is formed of a metallic material such as nickel (Ni), and the third portion "R3" is formed of a metallic material such as gold (Au). The first portion "R1" has a spherical shape, whereas the second and third portions "R2" and "R3" have a shell shape. The conductive ball 192 has a spherical shape as a whole.

In FIG. 6B, when a high pressure and a high temperature are applied, the first portion "R1" of a plastic resin is crushed and the shape is changed. Thus, the entire shape of the conductive ball 292 is also changed according to the transformation of the first portion "R1." The gate pad bump 180 (shown in FIG. 4) is electrically connected to the gate pad terminal 144 (shown in FIG. 4) by the transformed conductive ball 192.

FIG. 7 is a schematic cross-sectional view showing a pressing process for an LCD device according to the related art. In FIG. 7, an anisotropic conductive film (ACF) 190 is interposed between the gate pad bump 180 and a liquid crystal panel 115. The liquid crystal panel 115 includes the gate pad terminal 144 (shown in FIG. 4). The ACF 190 includes a plurality of conductive balls 192 (shown in FIG. 4) surrounded by a thermosetting resin (not shown). A heating tool 185 is disposed over the gate pad bump 180. When the heating tool 185 applies a heat and a pressure to the ACF 190, the conductive balls 192 in the ACF 190 may be crushed, thereby contacting the gatepad bump 180 and the gate pad terminal 144. The thermosetting resin is cured with heat and pressure to keep the crushed shapes of the conductive balls 192. As a result, the gate pad bump 180 is electrically connected to the gate pad terminal 144 of the liquid crystal panel 115.

Referring back to FIG. 4, the heat and the pressure for the transformation of the conductive ball 192 may cause a crack in the gate pad terminal 144 of a transparent conductive material. For example, a first portion "A" of the gate pad terminal 144 may be removed by the pressure of the conductive ball 192 to form a crack. Since the gate pad bump 180 does not completely cover the gate pad contact hole 141, a portion of the gate pad terminal 144 is exposed. Accordingly, external moisture and impurities may be infiltrated into the gate pad 140 through the crack in the gate pad terminal 144, thereby causing electronic corrosion of the gate pad 140. In addition, the gate pad terminal 144 may have a crack at a second portion "B." The second portion "B" corresponds to a step of the gate insulating layer 112 and the passivation layer 138 at the boundary of the gate pad contact hole 141. The external moisture and impurities may be infiltrated into the gate pad 140 through the crack in the gate pad terminal 144, thereby causing the electronic corrosion of the gate pad 140. Similarly, the electronic corrosion occurring in the gate pad portion "G" may occur in the data pad portion "D."

SUMMARY OF THE INVENTION

Accordingly, the present invention is directed to an LCD device and a method of fabricating the LCD device that substantially obviates one or more of the problems caused by limitations and disadvantages of the related art.

An object of the present invention is to provide an LCD device and a method of fabricating the LCD that electronic corrosion of gate and data pads can be prevented.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device includes a gate line and a data line crossing each other, a gate driving unit and a data driving unit outputting signals to the gate line and the data line, a gate pad portion electrically connected to the gate line and having a first contact hole, a data pad portion electrically connected to the data line and having a second contact hole, a first output terminal of the gate driving unit completely covering the first contact hole, a second output terminal of the data driving unit completely covering the second contact hole, a first conductive film electrically connecting the first output terminal and the gate pad portion, and a second conductive film electrically connecting the second output terminal and the data pad portion.

In another aspect, an LCD device includes first and second substrates having a display area and a non-display area, a gate pad portion and a data pad portion respectively having a gate pad contact hole and a data pad contact hole at the non-display area of the first substrate, a first conductive film and a second conductive film on the gate pad portion and the data pad portion, respectively, and a gate driving unit and a data driving unit on the first conductive film and the second conductive film, respectively, the gate driving unit having a gate pad bump and the data driving unit having a data pad bump, the gate pad bump entirely covering the gate pad contact hole and the data pad bump completely covering the data pad contact hole.

In another aspect, a method of fabricating an LCD device includes forming a gate pad portion and a data pad portion on a first substrate, the first substrate having a display area and a non-display area, the gate pad portion and the data pad portion in the non-display area, the gate pad portion and the data pad portion having a gate pad contact hole and a data pad contact hole, respectively, forming a first conductive film and a second conductive film on the gate pad portion and the data pad portion, respectively, disposing a gate driving unit having a gate pad bump and a data driving unit having a data pad bump on the first conductive film and the second conductive film, respectively, such that the gate pad bump completely covers the gate pad contact hole and the data pad bump completely covers the data pad contact hole, and applying heat and pressure to the gate driving unit and the data driving unit such that the gate pad bump is electrically connected to the gate pad portion through the first conductive film and the data pad bump is electrically connected to the data pad bump through the second conductive film.

In another aspect, an LCD device includes a substrate having a display area and non-display area, an electrode pad having a contact hole at the non-display area of the substrate, a driving unit having an electrode pad bump completely covering the contact hole, a conductive film between the electrode pad and the electrode pad bump.

It is to be understood that both the foregoing general description and the following detailed description are exemplary and explanatory and are intended to provide further explanation of the invention as claimed.

BRIEF DESCRIPTION OF THE DRAWINGS

The accompanying drawings; which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 1:
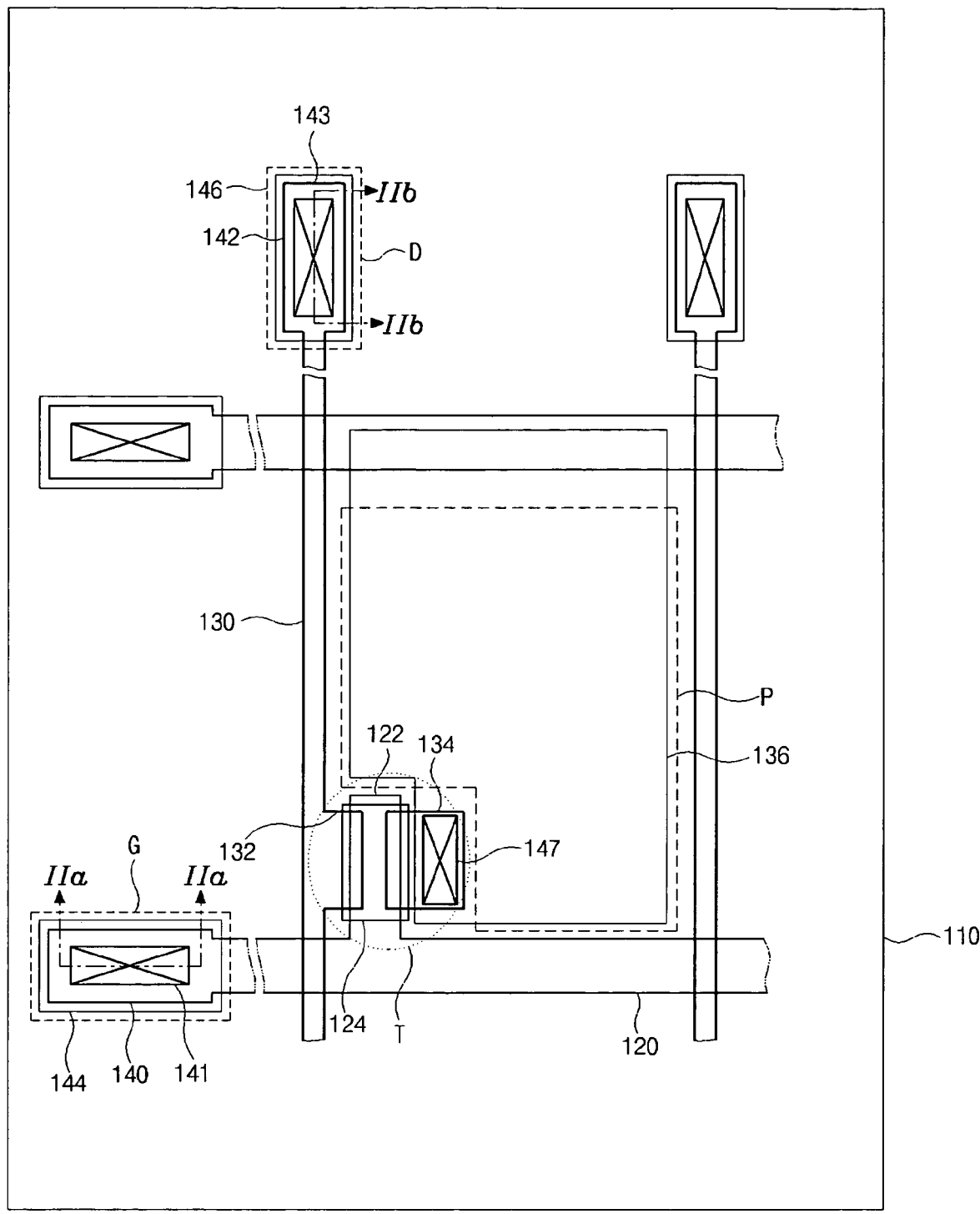
FIG. 1 is a schematic plan view showing an array substrate for an LCD device according to the related art.
Figure 2A:
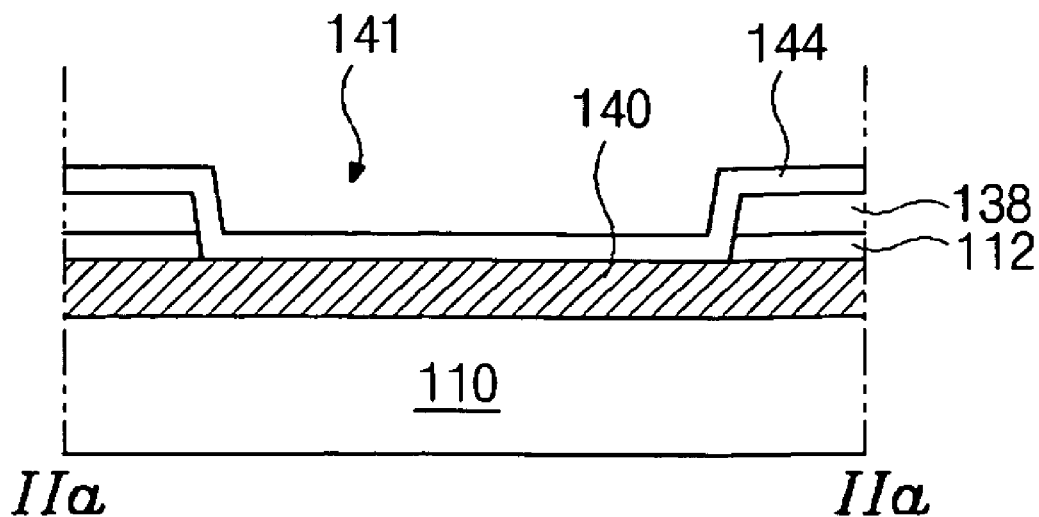
FIG. 2A is a schematic cross-sectional view taken along line "IIa-IIa" of FIG. 1.
Figure 2B:
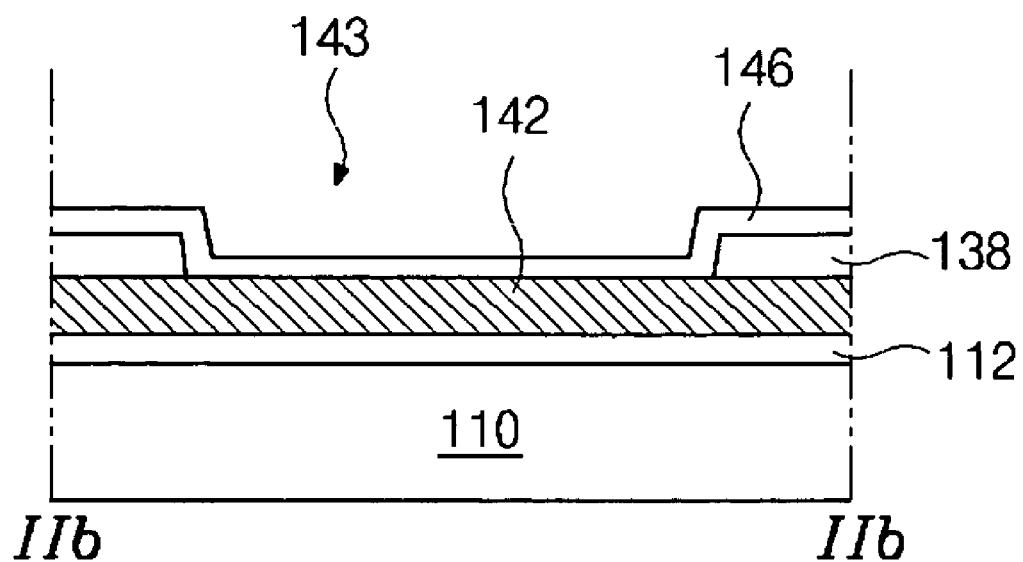
FIG. 2B is a schematic cross-sectional view taken along line "IIb-IIb" of FIG. 1.
Figure 3:
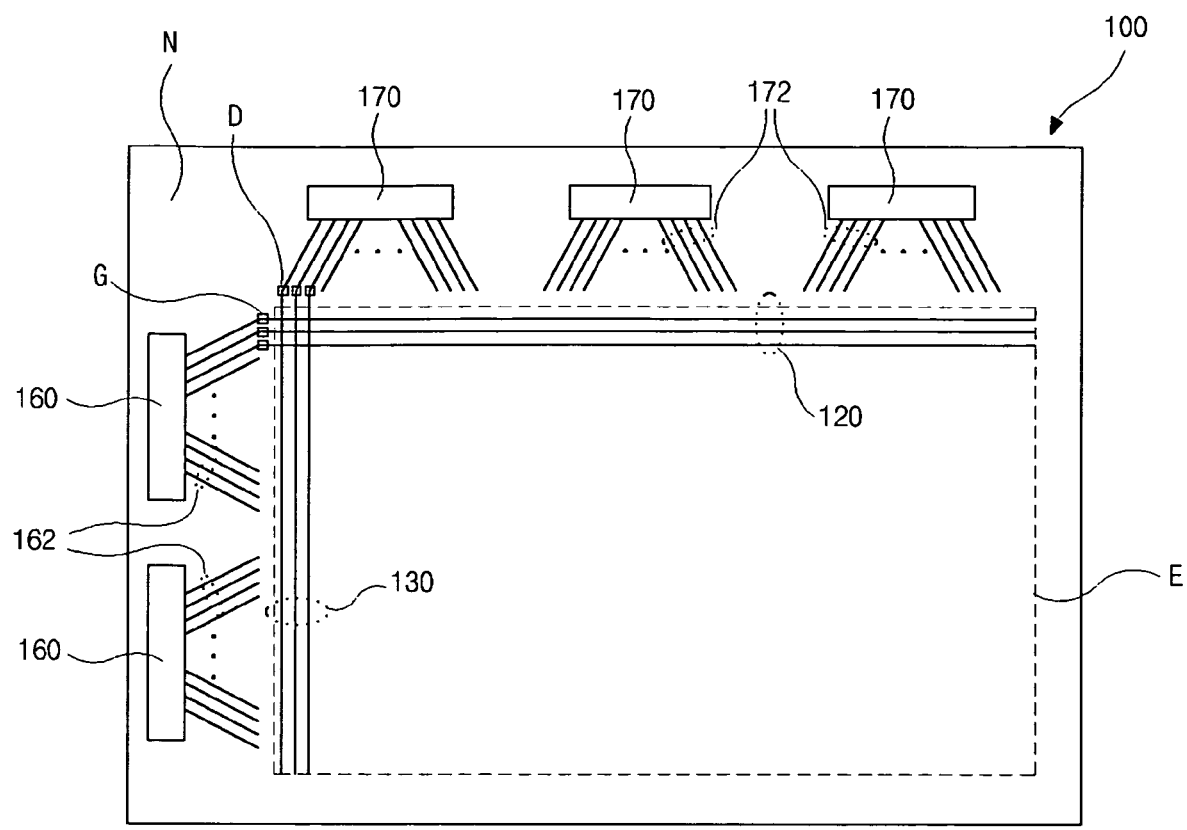
FIG. 3 is a schematic plan view showing a COG (chip on glass) type LCD device according to the related art.
Figure 4:
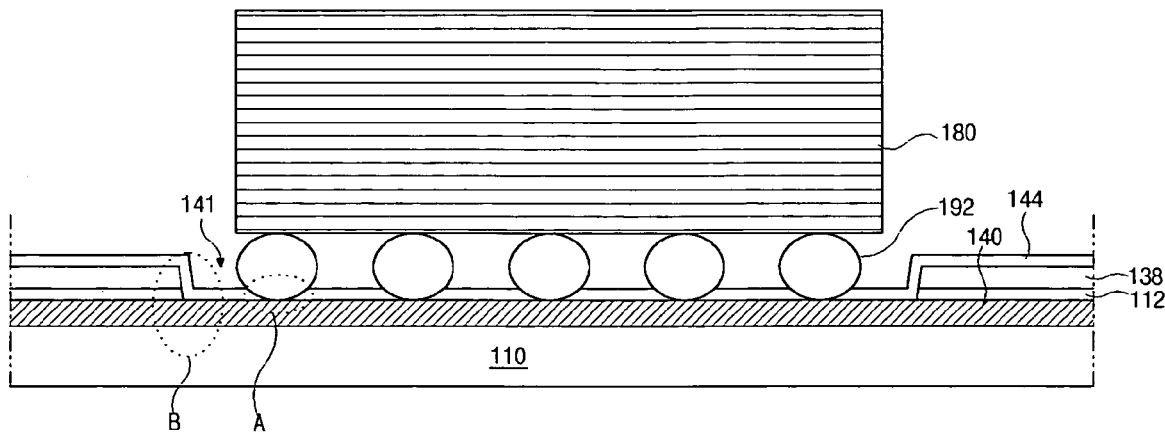
FIG. 4 is a schematic cross-sectional view showing a gate pad portion and a gate output terminal of an LCD device according to the related art.
Figure 5:
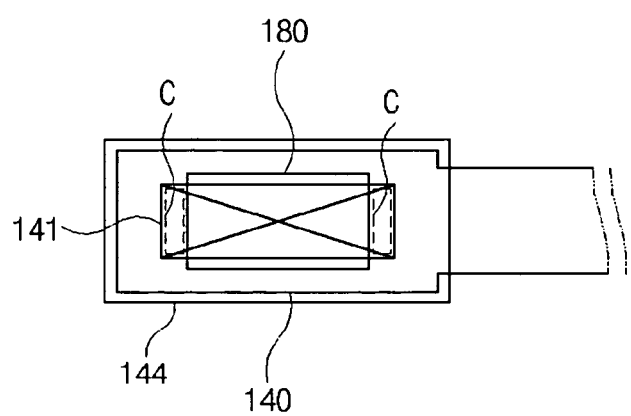
FIG. 5 is a schematic plan view showing a gate pad portion and a gate output terminal of an LCD device according to the related art.
Figure 6A:
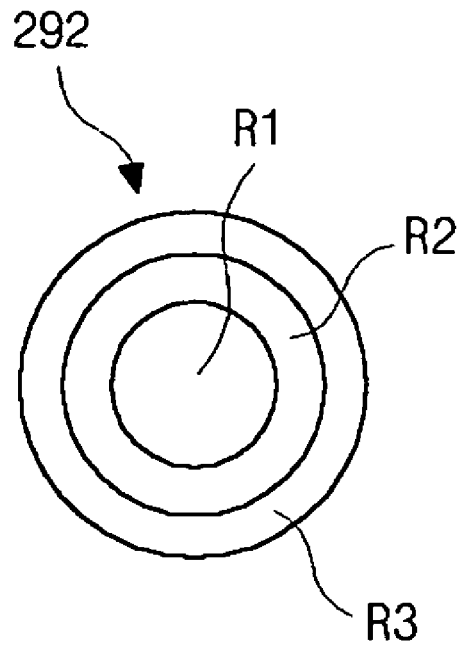
FIGS. 6A and 6B are schematic views illustrating transformation of a conductive ball according to the related art.
Figure 6B:
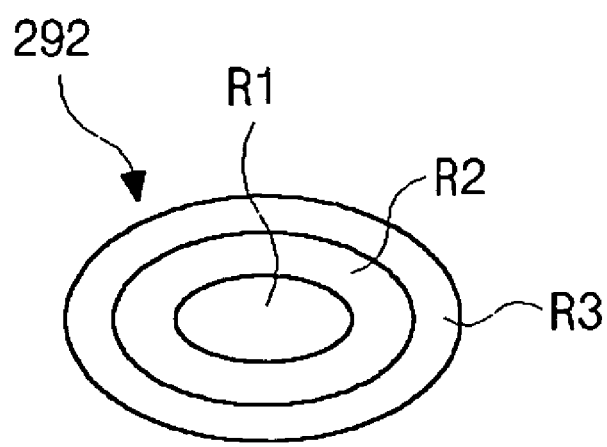
Figure 7:
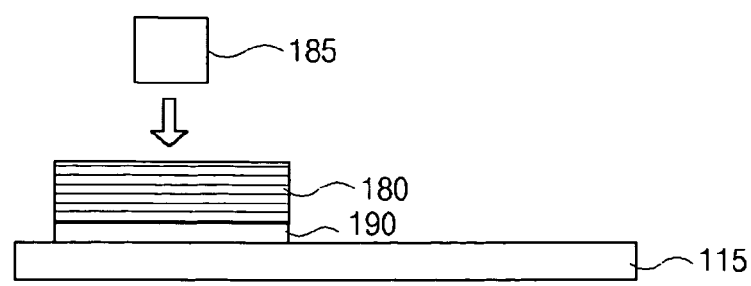
FIG. 7 is a schematic cross-sectional view showing a pressing process in fabricating an LCD device according to the related art.
Figure 8:
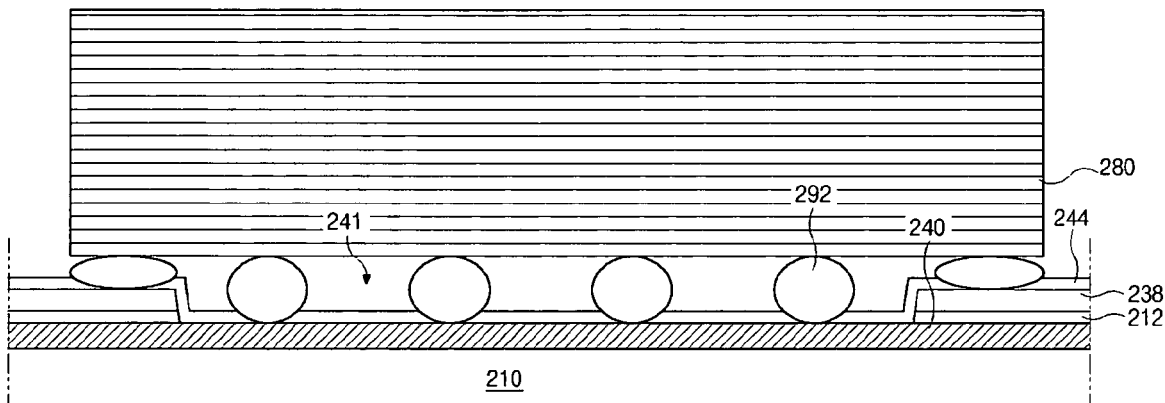
FIG. 8 is a schematic cross-sectional view showing a gate pad portion of a COG type LCD device according to an embodiment of the present invention.

FIG. 8 is a schematic cross-sectional view showing a gate pad portion of a chip on glass (COG) type LCD device according to an embodiment of the present invention. In FIG. 8, a gate pad 240 is formed on a substrate 210. A gate insulating layer 212 and a passivation layer 238 are sequentially formed on the gate pad 240. The gate insulating layer 212 and the passivation layer 238 may have a gate pad contact hole 241 exposing a portion of the gate pad 240. A gate pad terminal 244 is formed on the passivation layer 238 and connected to the gate pad 240 through the gate pad contact hole 241. A gate pad bump 280 is formed over the gate pad terminal 244 and a plurality of conductive balls 292 are formed between the gate pad bump 280 and the gate pad terminal 244. The gate pad bump 280 may be used as an output terminal of a gate driving unit (not shown). In addition, since the gate pad bump 280 completely covers the gate pad contact hole 241, a portion of the gate pad terminal 244 corresponding to the gate pad contact hole 241 is not exposed.

The gate pad 240 may be simultaneously formed with a gate line (not shown) in a display area of a liquid crystal panel through the same process. In addition, the gate pad 240 may be formed of a conductive metallic material such as aluminum (Al), tungsten (W), molybdenum (Mo), chromium (Cr) or the like. After the metallic material is disposed on the substrate 210, the gate pad 240 may be formed through a photolithographic process and an etch process. If the gate pad 240 is exposed to external moisture and impurities, the gate pad 240 may be electronically corroded. Moreover, static electricity may cause deterioration of the gate line in a subsequent process. Accordingly, the gate pad 240 is protected by forming the gate insulating layer 212 and the passivation layer 238 thereon.

The gate insulating layer 212 may be formed of one of an inorganic insulating material and an organic insulating material. The inorganic insulating material includes silicon oxide ($SiO_2$) and silicon nitride (SiNx) and the organic insulating material includes benzocyclobutene (BCB) and acrylic resin. After one of the inorganic insulating material and the organic insulating material is deposited on the gate pad 240, the gate pad contact hole 241 may be formed in the gate insulating layer 212 through a photolithographic process and an etch process.

The passivation layer 238 may also be formed of one of an inorganic insulating material and an organic insulating material. The inorganic insulating material includes silicon oxide ($SiO_2$) and silicon nitride (SiNx) and the organic insulating material includes benzocyclobutene (BCB) and acrylic resin.

The passivation layer 238 may be formed on the entire surface of the substrate 210 having source and drain electrodes (not shown) in the display area of the liquid crystal panel. The gate pad contact hole 241 may be formed in the passivation layer 238 through a photolithographic process and an etch process. In another embodiment, the gate pad contact hole 241 may be formed in the gate insulating layer 212 and the passivation layer 238 after the passivation layer 238 is formed.

The gate pad terminal 244 is formed of a transparent conductive material such as indium-tin-oxide (ITO), indium-zinc-oxide (IZO) or the like. Since the transparent conductive material is corrosion-resistive and the gate pad terminal 244 shields the gate pad 240 from the exterior, the gate pad terminal 244 may protect the gate pad 140 from the electronic corrosion. A scanning signal output from a gate driving unit (not shown) is transmitted to the gate line (not shown) through a gate pad portion including the gate pad 240 and the gate pad terminal 244. The scanning signal of the gate line is transmitted to a TFT to turn on/off the TFT.

Figure 9:
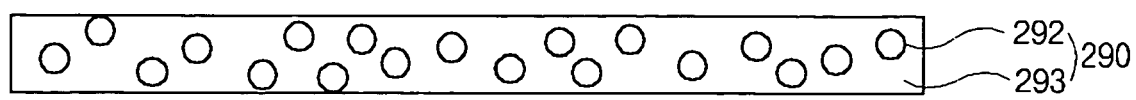
FIG. 9 is a view showing an anisotropic conductive film for the LCD device of FIG. 8.

FIG. 9 is a view showing an anisotropic conductive film for an LCD device according to an embodiment of the present invention. In FIG. 9, an anisotropic conductive film (ACF) 290 includes a plurality of conductive balls 292 and a thermosetting resin 293 surrounding the plurality of conductive balls 292. When heat and pressure are applied to the ACF 290, the plurality of conductive balls 292 in the ACF 290 are crushed and the thermosetting resin 293 is cured, thereby contacting the gate pad bump 280 (shown in FIG. 8) and the gate pad terminal 244 (shown in FIG. 8). As a result, the gate pad bump 280 is electrically connected to the gate pad terminal 244. Each of the conductive balls 292 may include a first portion of a plastic resin, a second portion of a metallic material such as nickel (Ni) surrounding the first portion and a third portion of a metallic material such as gold (Au) surrounding the second portion. The first portion of a plastic resin provides elasticity to the plurality of conductive balls 292. When heat and pressure are applied, a plurality of conductive balls 292 are crushed according to the transformation of the first portion of a plastic resin.

Referring back to FIG. 8, when heat and pressure is applied to a plurality of conductive balls 292, the conductive balls 292 are crushed and contact the gate pad bump 280 and the gate pad 240. Accordingly, the gate pad bump 280 is electrically connected to the gate pad 240 through the conductive balls 292. The gate pad bump 280 may be formed of a metallic material such as copper (Cu) and transmit a scanning signal to the gate pad terminal 244. In addition, the gate pad bump 280 completely covers the gate pad contact hole 241. In other words, a width of the gate pad bump 280 is greater than that of the gate pad contact hole 241. Accordingly, any portion of the gate pad terminal 244 corresponding to the gate pad contact hole 241 is not exposed and the electronic corrosion is prevented.

Figure 10:
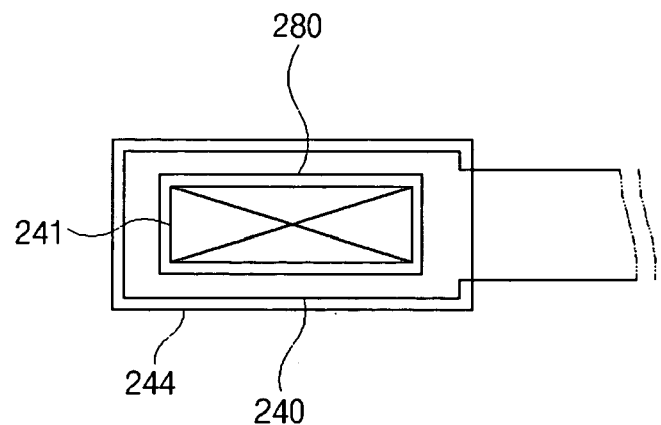
FIG. 10 is a schematic plan view showing a gate pad portion and a gate output terminal of the LCD device of FIG. 8.

FIG. 10 is a schematic plan view showing a gate pad portion and a gate output terminal of an LCD device according to an embodiment of the present invention. As shown in FIG. 10, a width of the gate pad bump 280 used as a gate output terminal of a gate driving unit is greater than that of the gate pad contact hole 241. Accordingly, the gate pad terminal 244 corresponding to the gate pad contact hole 241 is completely covered with the gate pad bump 280.

In a COG type LCD device, heat and pressure are applied to connect the gate pad terminal 244 and the gate pad bump 280 electrically through the conductive balls 292 in the ACF 290. When heat and pressure are applied to the gate pad bump 280, the conductive balls 292 are crushed to contact the gate pad bump 280 and the gate pad terminal 244. A crack may be created in the gate pad terminal 244 by the pressure of the conductive balls 292. Moreover, a crack may be created in the gate pad terminal 244 at a step of the gate insulating layer 212 and the passivation layer 238, i.e., a boundary of the gate pad contact hole 241. If the cracks are created, external moisture and impurities may infiltrate into the gate pad 240 and cause electronic corrosion of the gate pad 240. In an COG type LCD device according to an embodiment of the present invention, however, since the gate pad bump 280 completely covers the gate pad terminal 244 corresponding to the gate pad contact hole 241, the gate pad terminal 246 corresponding to the gate pad contact hole 241 is shielded from the exterior. Accordingly, external moisture and impurities do not infiltrate into the gate pad 240 and the electronic corrosion of the gate pad 240 does not occur.

Referring back to FIGS. 8 to 10, the gate pad bump 280 completely covers the gate pad contact hole 241 and the conductive balls 292 in the ACF 290 contacts the gate pad bump 280 and the gate pad terminal 244. Specifically, the conductive balls 292 and the thermosetting resin 293 over the passivation layer 238 shield the gate pad terminal 244 corresponding to the gate pad contact hole 241 from the exterior with the gate pad bump 280. As mentioned above, cracks of the gate pad terminal 244 may be created at a portion corresponding to the conductive balls 292 and a boundary portion (a step portion) of the gate pad contact hole 241. All portions where cracks may be created are completely shielded from the exterior by the gate pad bump 280, the conductive balls 292 and the thermosetting resin 293 over the passivation layer 238. As a result, even when cracks are created, external moisture and impurities will not infiltrate into the gate pad 240 through the cracks.

Figure 11:
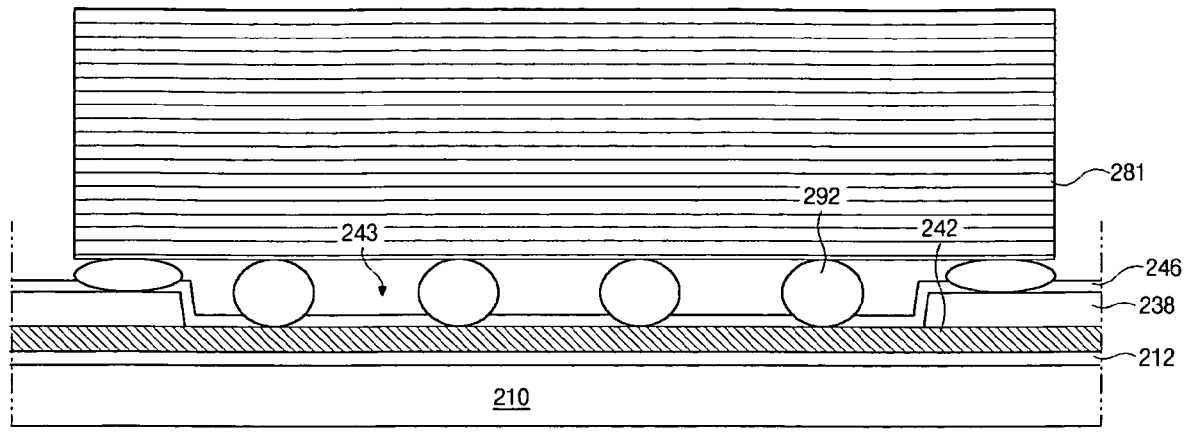
FIG. 11 is a schematic cross-sectional view showing a data pad portion of a COG type LCD device according to another embodiment of the present invention.
Figure 12:
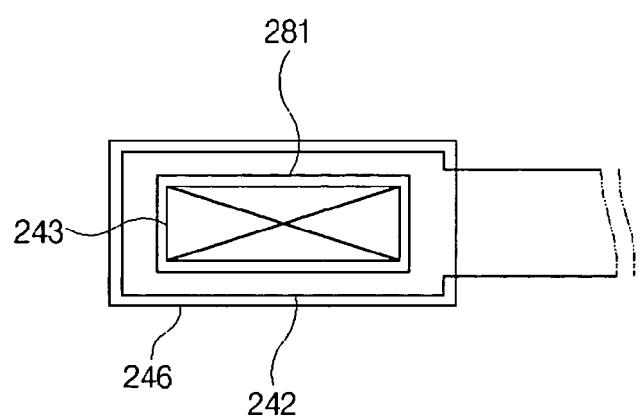
FIG. 12 is a schematic plan view showing a data pad portion and a data output terminal of the LCD device of FIG. 11.

FIG. 11 is a schematic cross-sectional view showing a data pad portion of a chip on glass type LCD device according to an embodiment of the present invention, and FIG. 12 is a schematic plan view showing a data pad portion and a data output terminal of the LCD device of FIG. 11. In FIGS. 11 and 12, a data pad bump 281 used as a data output terminal of a data driving unit completely covers a data pad terminal 246 corresponding to a data pad contact hole 243. In other words, the data pad bump 281 completely covers the data pad contact hole 243. Accordingly, the data pad terminal 246 corresponding to the data pad contact hole 243 is shielded from the exterior by the data pad bump 281, the conductive balls 292 and a thermosetting resin over a passivation layer 238.

In a data pad portion, the gate insulating layer 212 is formed on the substrate 210 and a data pad 242 is formed on the gate insulating layer 212. The passivation layer 238 is formed on the data pad 242. The passivation layer 238 has a data pad contact hole 243 exposing a portion of the data pad 242. A data pad terminal 246 is formed on the passivation layer 238 and connected to the data pad 242 through the data pad contact hole 243. The data pad 242 may be simultaneously formed with a data line (not shown) in a display area of a liquid crystal panel through the same process. In addition, the data pad terminal 246 may be formed of a transparent conductive material such as indium-tin-oxide (ITO), indium-zinc-oxide (IZO) or the like.

The data pad bump 281 is electrically connected to the data pad terminal 246 through the conductive balls 292 in the ACF 290. Specifically, the conductive balls 292 and the thermosetting resin over the passivation layer 238 shield the data pad terminal 246 corresponding to the data pad contact hole 243 from the exterior with the data pad bump 281. Cracks of the data pad terminal 246 may be created at portions corresponding to the conductive balls 292 and a boundary portion (a step portion) of the data pad contact hole 243. All portions where cracks may be created are completely shielded from exterior by the data pad bump 281, the plurality of conductive balls 292 and the thermosetting resin over the passivation layer 238. As a result, even when cracks are created, external moisture and impurities will not infiltrate into the data pad 242 through the cracks.

In the embodiments of the present invention, since the gate pad bump completely covers the gate pad contact hole and the data pad bump entirely covers the data pad contact hole, the gate pad and the data pad are shielded from external moisture and impurities. Therefore, the electronic corrosion of the gate pad and the data pad can be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
  a gate line and a data line crossing each other;
  a gate driving unit and a data driving unit outputting signals to the gate line and the data line;
  a gate pad portion electrically connected to the gate line and having a gate pad, a gate pad terminal and a first contact hole, wherein the gate pad electrically connected to the gate line, and the gate pad terminal contacting an entire surface of an exposed portion of the gate pad through the first contact hole;
  a data pad portion electrically connected to the data line and having a data pad, a data pad terminal and a second contact hole, wherein the data pad electrically connected to the data line, and the data pad terminal contacting an entire surface of an exposed portion of the data pad through the second contact hole;
  a first output terminal of the gate driving unit completely covering the first contact hole;
  a second output terminal of the data driving unit completely covering the second contact hole;
  a first conductive film electrically connecting the first output terminal and the gate pad portion; and
  a second conductive film electrically connecting the second output terminal and the data pad portion,
  wherein the gate pad is larger than the first output terminal and the data pad is larger than the second output terminal, and wherein the first conductive film and the second conductive film have the substantially same width as the first output terminal and the second output terminal, respectively.

2. The LCD device according to claim 1, wherein the gate pad terminal electrically connected to the first output terminal through the first conductive film.

3. The LCD device according to claim 1, wherein the gate pad terminal comprises one of indium-tin-oxide (ITO) and indium-zinc-oxide (IZO).

4. The LCD device according to claim 1, wherein the data pad terminal electrically connected to the second output terminal through the second conductive film.

5. The LCD device according to claim 1, wherein the data pad terminal comprises one of indium-tin-oxide (ITO) and indium-zinc-oxide (IZO).

6. The LCD device according to claim 1, wherein the first and second conductive films comprise a plurality of conductive balls and a thermosetting resin surrounding the at least one conductive ball.

7. The LCD device according to claim 6, wherein the conductive balls comprise an elastic plastic resin and a conductive metallic material surrounding the elastic plastic resin.

8. A liquid crystal display (LCD) device, comprising:
  first and second substrates having a display area and a non-display area;
  a gate pad portion and a data pad portion respectively having a gate pad contact hole and a data pad contact hole at the non-display area of the first substrate;
  a first conductive film and a second conductive film on the gate pad portion and the data pad portion, respectively; and
  a gate driving unit and a data driving unit on the first conductive film and the second conductive film, respectively, the gate driving unit having a gate pad bump and the data driving unit having a data pad bump, the gate pad bump completely covering the gate pad contact hole and the data pad bump completely covering the data pad contact hole,
  wherein the gate pad portion includes a gate pad and a gate pad terminal contacting an entire surface of an exposed portion of the gate pad through the gate pad contact hole, and the data pad portion includes a data pad and a data pad terminal contacting an entire surface of an exposed portion of the data pad through the data pad contact hole, and wherein the gate pad is larger than the gate pad bump and the data pad is larger than the data pad bump, and the first conductive film and the second conductive film have the substantially same width as the gate pad bump and the data pad bump, respectively.

9. The LCD device according to claim 8, wherein the gate pad contact hole has a step at a boundary portion and the gate pad bump covers the step of the gate pad contact hole.

10. The LCD device according to claim 8, wherein the data pad contact hole has a step at a boundary portion and the data pad bump covers the step of the data pad contact hole.

11. The LCD device according to claim 8, wherein the gate pad portion further comprises:
  a gate insulating layer on the gate pad; and
  a passivation layer on the gate insulating layer, the passivation layer and the gate insulating layer having the gate pad contact hole exposing at least a portion of the gate pad,
  wherein the gate pad is formed on the first substrate, and the gate pad terminal is formed on the passivation layer.

12. The LCD device according to claim 11, wherein the gate pad terminal is electrically connected to the gate pad bump through the first conductive film.

13. The LCD device according to claim 8,.wherein the data pad portion further comprises:
  a gate insulating layer on the first substrate; and
  a passivation layer on the data pad, the passivation layer having the data pad contact hole exposing at least a portion the data pad,
  wherein the data pad is formed on the gate insulating layer, the data pad terminal is formed on the passivation layer.

14. The LCD device according to claim 13, wherein the data pad terminal is electrically connected to the data pad bump through the second conductive film.

15. The LCD device according to claim 8, wherein each of the first and second conductive films comprises at least one conductive ball and a thermosetting resin surrounding the at least one conductive ball.

16. The LCD device according to claim 15, wherein the at least one conductive ball comprises a first portion of a plastic resin, a second portion of a first metallic material surrounding the first portion and a third portion of a second metallic material surrounding the second portion.

17. The LCD device according to claim 8, wherein the first substrate comprises at least a gate line and a data line in the display area.

18. The LCD device according to claim 17, wherein the gate pad portion and the data pad portion are electrically connected to the gate line and the data line, respectively.

19. A method of fabricating a liquid crystal display (LCD) device, comprising:

forming a gate pad portion and a data pad portion on a first substrate, the first substrate having a display area and a non-display area, the gate pad portion and the data pad portion in the non-display area and having a gate pad contact hole and a data pad contact hole, respectively;

forming a first conductive film and a second conductive film on the gate pad portion and the data pad portion, respectively;

disposing a gate driving unit having a gate pad bump and a data driving unit having a data pad bump on the first conductive film and the second conductive film, respectively, such that the gate pad bump completely covers the gate pad contact hole and the data pad bump completely covers the data pad contact hole; and applying heat and pressure to the gate driving unit and the data driving unit such that the gate pad bump is electrically connected to the gate pad portion through the first conductive film and the data pad bump is electrically connected to the data pad bump through the second conductive film, wherein the gate pad portion includes a gate pad and a gate pad terminal contacting an entire surface of an exposed portion of the gate pad through the gate pad contact hole, and the data pad portion includes a data pad and a data pad terminal contacting an entire surface of an exposed portion of the data pad through the data pad contact hole, and wherein the gate pad is larger than the gate pad bump and the data pad is larger than the data pad bump, and the first conductive film and the second conductive film have the substantially same width as the gate pad bump and the data pad bump, respectively.

20. The method according to claim 19, further comprising forming a gate line and a data line on the first substrate in the display area.

21. A liquid crystal display (LCD) device, comprising:

a substrate having a display area and non-display area;

an electrode pad portion having an electrode pad, and electrode pad terminal and a contact hole at the non-display area of the substrate, wherein the electrode pad terminal contacting an entire surface of an exposed portion of the electrode pad through the contact hole;

a driving unit having an electrode pad bump completely covering the contact hole; and a conductive film between the electrode pad and the electrode pad bump, wherein the electrode pad is larger than the electrode bump, and the conductive film has the substantially same width as the electrode bump.

22. The LCD device according to claim 21, wherein the conductive film comprises a plurality of conductive balls and a thermosetting resin surrounding the conductive balls.

23. The LCD device according to claim 22, wherein the conductive balls comprise an elastic plastic resin and a conductive metallic material surrounding the elastic plastic resin.

24. The LCD device according to claim 21, wherein the electrode pad bump has a width wider than that of the contact hole.

* * * * *